Nov. 6, 1956  J. E. DIMMETT  2,769,594
DUAL SELECTIVE REGISTERS
Filed Sept. 17, 1952  3 Sheets-Sheet 1
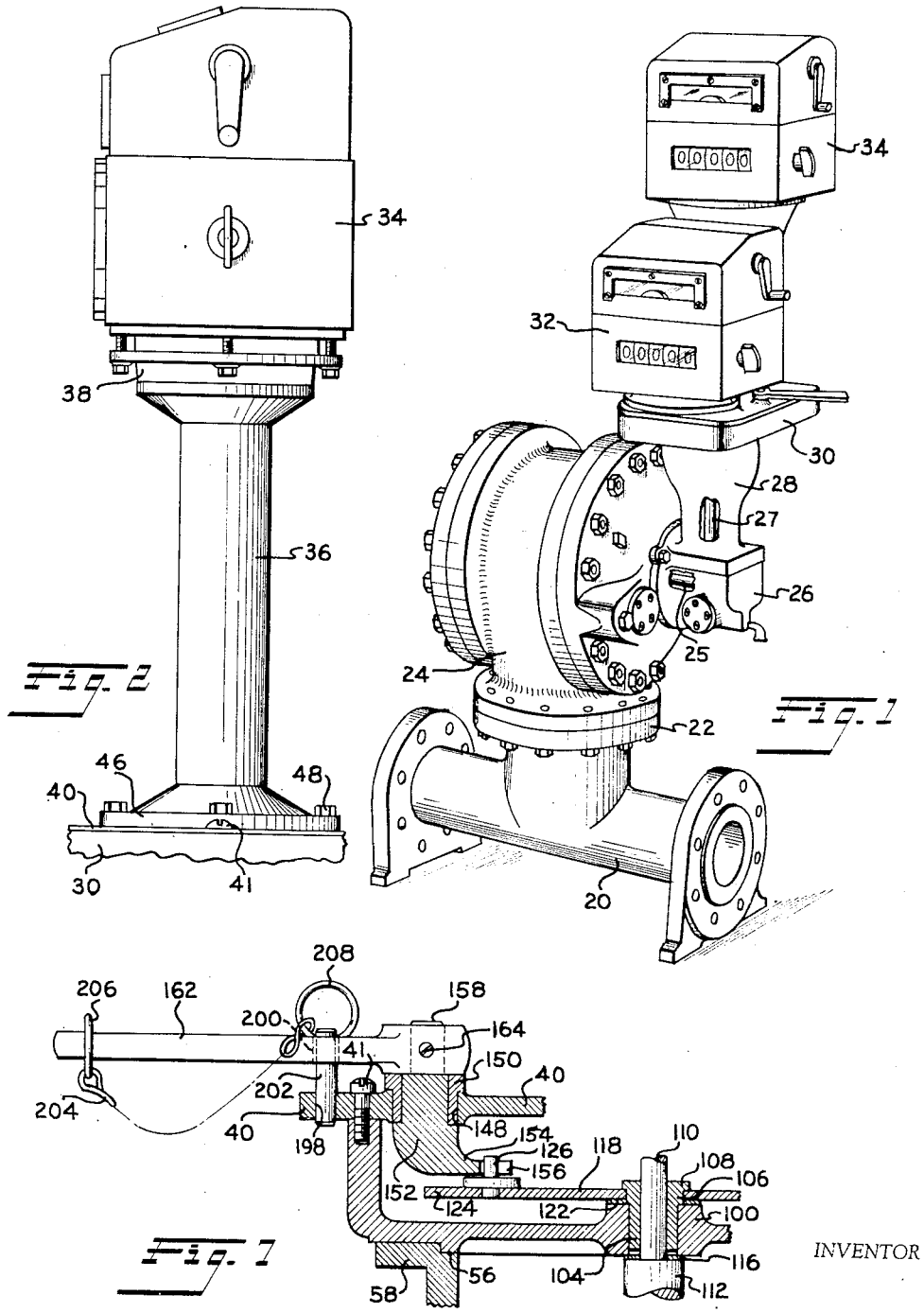
INVENTOR
JAMES E. DIMMETT
BY Strauch, Nolan & Diggins
ATTORNEYS Nov. 6, 1956

J. E. DIMMETT 2,769,594

DUAL SELECTIVE REGISTERS

Filed Sept. 17, 1952

INVENTOR

JAMES E. DIMMETT

BY *Strauch, Nolan + Diggins*

ATTORNEYS

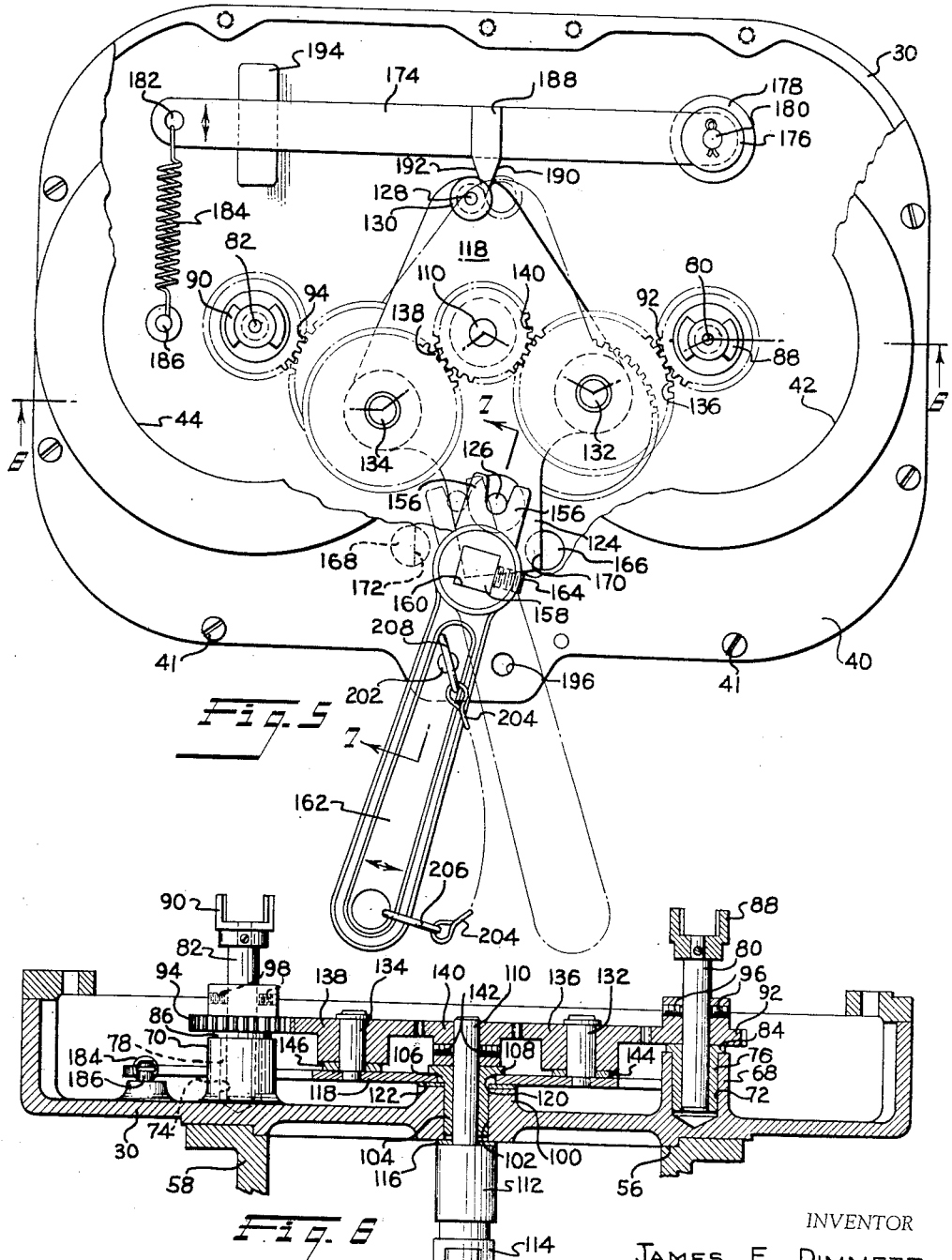

United States Patent Office 2,769,594
Patented Nov. 6, 1956

2,769,594

DUAL SELECTIVE REGISTERS

James Edward Dimmett, Pittsburgh, Pa., assignor to Rockwell Manufacturing Company, Pittsburgh, Pa., a corporation of Pennsylvania Application September 17, 1952, Serial No. 310,023

21 Claims. (Cl. 235—91)

This invention relates to apparatus for selectively connecting one of a plurality of indicating or recording devices to a power source such as a flow meter through which different fluids may be successively passed and particularly to a shiftable power transmitting drive selector unit therefore that can be easily and efficiently associated with alternate indicators or registers.

This invention will be particularly disclosed in its preferred embodiment wherein a single flow meter in a pipeline through which different liquids may be consecutively passed is connected to drive one of two printing registers through a novel selector mechanism that may be readily operated to connect the meter drive to either register, but the drive selector unit is generally applicable for connecting any single shaft to either of two other shafts.

A major object of this invention is to provide novel mechanism for selectively driving one of a plurality of devices such as indicators from a single source of power.

A further object of this invention is to provide mechanism for selectively driving one of a plurality of indicators and the like and embodying a novel arrangement for positively maintaining the mechanism in a selected drive position.

Another object of this invention is to provide a novel shiftable drive selector mechanism for a plurality of indicators or the like wherein shifting of the mechanism is positively limited to prevent any binding of the inter-engaging elements.

It is a further object of the invention to provide mechanism for driving either of two shafts from a single drive shaft, or vice versa embodying an intermediate shiftable gear carrier that is provided with novel biasing and locking arrangements.

A further object of the invention is to provide a novel meter, drive selector housing and dual register combination wherein two registers are mounted on the cover of the drive selector housing which in turn is mounted on the meter casing.

These and other objects and advantages reside in novel features of construction, arrangement, and combination of parts as will hereinafter be more fully set forth and pointed out in the following description and appended claims when read in connection with the drawings wherein:

Figure 1 is a perspective view of an assembly according to a preferred embodiment of the present invention showing a meter, a drive selector, and a pair of indicators mounted at different levels, to facilitae reading of both meters from the same side.

Figure 2 is a side elevational view of the rear indicator shown in Figure 1 showing the extension for raising the indicator above the front indicator and also showing a 360° swivel adapter between the extension and the indicator.

Figure 5 is a top plan view, partly broken away, of the drive selector housing showing the mechanism in its two positions in full and dotted lines respectively.

Figure 6 is a longitudinal section of the drive selector housing taken along the line 6—6 of Figure 5.

Figure 7 is a section along line 7—7 of Figure 5 showing the connection between the actuating lever and the gear carrier, and also showing the positive lock for the lever.

Figure 3:
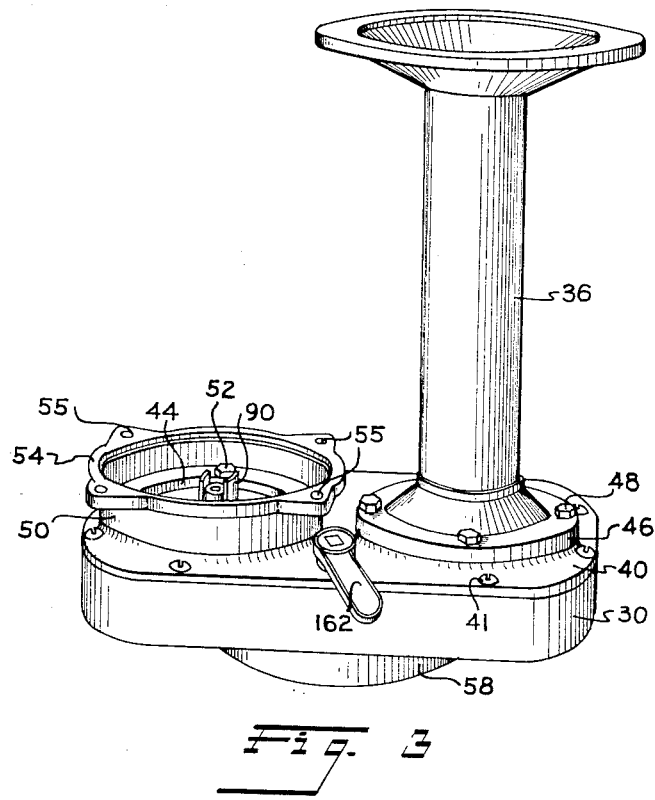
Figure 3 is a top photographic view showing the method of attaching the meter and extension to the selector housing.
Figure 4:
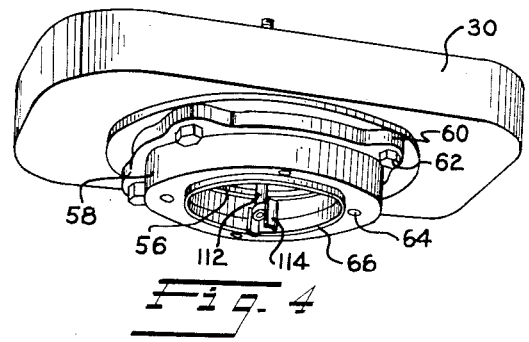
Figure 4 is a bottom photographic view of the selector housing showing the means of attaching the selector housing to the adapter box extension.

Referring to the drawings wherein like reference numerals designate corresponding parts throughout the several figures, there is shown in Figure 1 a pipe line section 20 having a portion 22 for mounting a fluid actuated flow meter 24. Flow meter 24 is of any known type being suitably connected to be actuated by fluid passing through section 20 and having a generally horizontal output shaft indicated at 25. An adapter box 26 is secured to the meter housing and the flow meter output shaft is therein geared to a shaft 27 extending upwards at right angles. A housing extension 28 surrounds shaft 27 and is attached to adapter 26 and provides a mounting pad for a cup-shaped selector housing 30 above and in non-interfering relation with flow meter 24. A pair of indicators 32 and 34 which here are ticket printing registers are mounted on selector housing 30, and as shown in Figure 1 indicator 34 is mounted at a higher level than indicator 32 to facilitate reading and servicing of both meters from the same side.

Referring to Figure 2, an elongated hollow extension 36 permits the outward and upward spacing of indicator 34 from housing 30. A swivel connection 38 is provided between extension 36 and indicator 34 to permit 360 degree rotation of indicator 34 about the vertical axis of extension 36 so that it can be set at any convenient position.

Selector housing 30 is provided with a cover plate 40 secured to the housing by means of machine screws 41 and having a pair of circular openings 42 and 44. Extension 36 has a flared and flanged base portion 46 provided with four holes spaced 90° apart to facilitate the mounting of extension 36 on cover plate 40 over opening 42 as by bolts 48 in any of four relatively rotated positions. A ring adapter 50 is mounted on cover plate 40 over opening 44 and is secured to the cover plate as by bolts 52. Ring adapter 50 is provided with a smooth surfaced top flange 54 having four equally spaced bolt holes 55 to facilitate the mounting of indicator 32 on the ring adapter in any of four relatively rotated positions.

The bottom wall of housing 30 is also provided with a central boss 56. A second ring adapter 58, similar to adapter 50, is mounted with a flange 60 interfitting with boss 56 and contacting the under surface of housing 30, and is secured thereto by bolts 62. The outer end of adapter 58 is provided with four equally spaced bolt holes 64 for securing the adapter to a suitable upper end flange on extension 28 in any of four relatively rotated positons. A pilot boss 66 extends downwardly from adapter 58 into an opposed opening in extension 28 to facilitate accurate mounting of adapter 58 on extension 28.

Thus selector housing 30 is rigidly mounted on the meter, register 32 and long extension 36 are rigidly mounted on housing cover 40, and register 34 is swiveled on extension 36.

Referring now to Figures 5, 6, and 7 there is shown the details of the drive selector housing and shiftable gearing. Housing 30 is provided with a pair of spaced apart integral bosses 68 and 70 in its bottom wall. Bosses 68 and 70 have blind holes 72 and 74 lined with journal members 76 and 78, preferably bearing bronze, for rotatably receiving a pair of driven shafts 80 and 82. The outer ends of journals 76 and 78 are provided with shoulder portions 84 and 86 overlying the ends of bosses 68 and 70, for a purpose which will be described. Shafts 80 and 82 are provided with drive couplings 88 and 90 at their upper ends. Shafts 80 and 82 are held within bosses 68 and 70 by gravity and the connection with the indicators. However if necessary, suitable means can be employed to rotatably secure the shafts in the bosses. Gears 92 and 94 are mounted on shafts 80 and 82 in thrust relation with shoulders 84 and 86 of journals 76 and 78 and are secured to the shafts as by set screws 96 and 98, so that rotary motion of the gears will be imparted to the freely journalled shafts.

Another boss 100 is integrally formed in the bottom inner wall of the housing centrally of boss 56 and equidistant from bosses 68 and 70 and the axis of all of these bosses are parallel. Boss 100 is provided with a central bore 102 in which a bearing element 104 having a pair of vertically spaced shoulders 106 and 108 is mounted.

A drive shaft 110 is journaled in the bearing 104 and has an enlarged cylindrical portion 112 exteriorly of the housing. At the lower end of shaft 110 is secured a drive coupling 114 adapted to be connected to the upper end of shaft 27. A thrust washer 116, preferably of bronze, is disposed between the enlarged cylindrical portion 112 of the shaft and the exterior side of boss 100, to provide a smooth bearing surface for the shaft 110.

A gear carrier plate 118 having an opening 120 is pivotally mounted on the bearing 104 about the periphery of shoulder 106 and in abutting relation with a face of shoulder 108 and seats against a thrust washer 122, preferably of bronze, interposed between the plate and the end of boss 100. Plate 118 is generally triangular with a tail portion 124 extending from one side. A pin 126 is rigidly secured to the plate at the tail portion and a second pin 128 for rotatably mounting a cam roller 130 is secured to the plate at the apex opposite the tail portion. The remaining apices of the plate, which form the base line of the triangular plate, each have a rigidly mounted shaft 132 and 134 for rotatably mounting similar idler gears 136 and 138 which are constantly in mesh with a drive gear 140 secured, as by set screws 142, to drive shaft 110. Similar bearing washers 144 and 146, preferably of bronze, are interposed between idler gears 136 and 138 and plate 118 to provide a smooth running surface for the idler gears. Drive gear 140 bears against the exposed face of shoulder 108 of drive shaft bearing 104.

Thus drive shaft 110 and driven shafts 80 and 82 are freely rotatably supported on the bottom wall of housing 30 for rotation on fixed parallel axes that are normally vertical. Shafts 80 and 82 are equidistant from shaft 110, and all three shafts have their axes in a straight line. When the gear carrier 118 is turned in either direction about its pivot which is coaxial with shaft 110, gears 136 and 138 roll along the periphery of gear 140 and all remain in constant mesh.

Referring to Figures 5 and 7, housing cover plate 40 is provided with a bore 148 for receiving a shouldered bearing 150 in the vicinity of but in spaced relation to the pin 126 for receiving a rotatably mounted vertically disposed actuating shaft 152. Actuating shaft 152 has an integral lower portion 154 disposed at right angles to shaft portion 152 and is provided at its ends with a pair of spaced arms 156 which operatively receive the pin 126 therebetween. Shaft 152 has an upper portion 158, preferably of rectangular configuration, extending beyond bearing 150 for operative engagement with a similarly shaped opening 160 in a manual shift lever 162 secured to portion 158 as by set screws 164.

Thus referring to Figure 5, a clockwise force on lever 162 will impart a clockwise movement to portion 154 which through the operative engagement of arms 156 with pin 126 will impart a counterclockwise movement to plate 118 about bearing 104 permitting idler gear 136 to operatively engage gear 92. Rotation of lever 162 in the opposite direction disengages gears 136 and 92 and will permit engagement of idler gear 138 with gear 94.

In order to prevent bottoming of gear 136 with gear 92 and gear 138 with gear 94 and consequent binding, a pair of upstanding fixed stop members 166 and 168 are integrally formed on the bottom inner wall of housing 30 on either side and in spaced relation to tail portion 124 and have flat faces 170 and 172 for abutting contact with respective sides of the tail portion. Thus a positive stop is provided in the path of the plate 118 limiting its amount of swinging to permit proper operative engagement of the respective gear trains.

The selector housing 30 embodies self-contained means for maintaining the shiftable plate in its selected operating position, as well as permitting the use of handle 162 on other selector units. An elongated latch lever 174 is disposed within the housing and is generally located adjacent the end of plate 118 mounting pin 128. One end of lever 174 is disposed between a pair of washers 176, preferably of bronze, and pivotally mounted on boss 178, integrally formed on the bottom wall of casing 30, by means of pivot pin 180. The other end of lever 174 is provided with hole 182 through which one end of tension spring 184 is looped while the other end of the spring is looped about pin 186 fixed in the bottom wall of housing 30 so as to bias latch lever 174 toward the carrier plate. A projection 188 having convergent sides forming cam surfaces 190 and 192 for alternate engagement with roller 130 is rigidly mounted on lever 174 at a point lying substantially on the centerline through gear 140, which point is located closer to pivot pin 180 than to spring 184 so that the force exerted on cam roller 130 by either cam 190 or 192 is of greater magnitude than the biasing force of spring 184. In addition the distance between the center of cam roller 130 and the center of gear 140 is greater than the distances between the center of gear 140 and the centers of idler gears 136 and 138. As a result of these differences in length the force exerted by the cams 190 or 192 is greatly multiplied to hold the gears in a selected position. Projection 188 is positionable on either side of roller 130 so that either cam surface 190 or 192 is contacting the roller. As shown in Figure 5 in solid lines, cam surface 192 is in contact with roller 130 and under the biasing force of spring 184 tends to impart a counterclockwise rotation to plate 118 about bearing 104 so that idler gear 136 is held in mesh with gear 92. With cam surface 190 contacting the roller, idler gear 138 is resiliently held in mesh with gear 94 as is shown in dotted lines in Figure 5. A planar boss 194 integrally formed in the bottom wall of housing 30, as by casting, is located at the spring end of lever 174 in a plane parallel to the plane of plate 118. This boss acts as a sliding support for lever 174 to maintain the arm in the same plane as plate 118 and thereby assure proper engagement of cams 190 and 192 with roller 130.

Should lever 162 not be removed from the device after a setting, a positive lock is provided to prevent inadvertent actuation of the plate 118. Cover plate 40 is provided with a pair of holes 196 and 198 at the maximum travel of lever 162 in each direction. A hole 200 as shown in Figure 7 is also provided in lever 162 to be in line with holes 196 and 198 at respective ends of its travel so that pin 202 can be inserted into hole 200 and one of the holes 196 and 198 to positively maintain the lever 162 in its selected position. A chain 204, or the like, is secured to lever 162 as by loop 206 and to a loop 208 secured to pin 202 to prevent loss of lock pin 202.

In operation, the drive selector is as it appears in dotted lines in Figure 5 whereby shaft 82 is driven and register 32 only is operated. Should it be desired to operate indicator 34, lever 162 is moved clockwise which demeshes gears 94 and 138 and causes idler gear 136 to mesh with gear 92, so that rotation of shaft 110 by the flow meter will be imparted through gears 140, 136, and 92 to shaft 80 which rotation will finally be imparted to the indicator 34 through the connection of coupling 88 with a similar coupling on the indicator shaft (not shown). Once the handle has been used to make a selection it may be removed and shiftable plate 118 will be maintained in the selected position under the biasing force of spring actuated cam 192 bearing against roller 130. Thus there is a self-contained, unexposed mechanism for maintaining the selected gear train in mesh with no possibility of a recording cycle being inadvertently disrupted, and the handle is freed for use in setting other installations. Upon completion of a recording cycle and when it is desired to actuate indicator 32 while a ticket impression is being taken of indicator 34 lever 162 need only be turned in a counter-clockwise direction disengaging indicator 34 and engaging indicator 32.

It has been found, in practice, that dual registration units as described in the foregoing provide a practical means for making successive recordings from a single power shaft and provides a simple and effective method of selecting, driving, and maintaining a driving relation between a single power shaft and a plurality of indicators without the danger of inadvertent disruption of a recording cycle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. In an indicating mechanism including a flow meter through which fluid is continuously passed, a meter housing and a drive shaft extending through said housing; the combination comprising a drive selector housing mounted on said meter housing and surrounding said drive shaft, a pair of spaced apart alternately selectively driven members mounted in said selector housing extending exteriorly of said selector housing at one side, a ring adapter removably secured upon and upstanding from said selector housing surrounding one of said driven members, a first indicator mounted on said ring adapter and operatively connected to said one of said driven members whereby motion of the driven member is transmitted to said indicator, an elongated extension mounted at one end on said selector housing, a second indicator mounted on the other end of said extension and operatively connected to the other of said driven members through said extension whereby said second indicator is at a greater elevation than the first indicator to permit unobstructed reading and servicing of both of said indicators from the same side and movable selector means in said housing for optionally engaging said drive shaft with a selected indicator through a respective driven member.

2. In the combination defined in claim 1, means for swivel mounting said second indicator on the top of said extension.

3. A selector housing comprising a hollow body portion having a bottom wall, means on said wall to facilitate mounting of the housing on a flow meter, means on said wall adapted to rotatably mount a shaft for operative connection to a drive shaft of said meter; a pair of spaced apart upstanding portions integrally formed on the inner face of said wall; a bore in each of said portions for rotatably mounting a pair of driven members operatively connected to respective optionally driven indicators; a cover plate mounted on said hollow body forming a top wall of said housing; a pair of spaced apart openings in said cover to permit said driven members to extend exteriorly of said housing for operative connection to said indicators; and mounting means on said cover adjacent to and surrounding said openings adapted to mount said indicators in operative relation with said driven members and movable selector means in said housing for optionally engaging said drive shaft with a selected one of said driven members.

4. In a drive selector housing, a pair of spaced apart driven shafts, each adapted to be operatively connected to a respective indicator, a drive shaft gear assembly mounted in the housing with the axis of the drive shaft located on a straight line joining the axes of said driven shafts, a gear carrier pivotally mounted in said housing about the axis of said drive shaft so as to be selectively shiftable toward one or the other of said driven shafts, a pair of spaced idler gears mounted on said carrier constantly meshed with said drive shaft gear assembly and adapted to engage respective gears on said driven shafts upon selective shifting of said carrier, a line joining the axes of said idler gears being spaced from the axis of said drive shaft, means operatively connected to said carrier adapted to shift said carrier to operatively engage the drive shaft gear with one of said driven shaft gears through a respective idler gear, and locking means forcibly engaging said carrier at a point located at a greater distance from said drive shaft than the distance between said drive shaft and the line joining said idler elements, said lines between the axes of said idler gears and said locking means being located on opposite sides of the gear carrier pivot.

5. A dual registration unit for making selective indications comprising: a housing, a pair of spaced apart selectively driven indicators mounted exteriorly of the housing, a pair of spaced apart optionally driven shafts each having a gear thereon mounted within the housing each operatively connected to respective indicators, a selectively positionable carrier mounted within said housing for alternate movement toward one or the other of said shafts, fixed stops on the interior of said housing to define limits of movement of said carrier, a drive shaft extending into said housing having a drive gear mounted thereon adjacent said carrier, spaced apart idler gears movably mounted on said carrier operatively engaging said drive gear, means movably mounted in said housing in operative engagement with a portion of said carrier for alternately moving said carrier toward one or the other of said shafts to permit operative engagement of one of said idler gears with a gear on a selected shaft whereby driving motion is imparted to said selected shaft from said drive gear, and means mounted in said housing including a resilient biasing member and a movable lever means resiliently biased into selective contacting relation with said carrier to exert a force greater than said resilient biasing force on said carrier to maintain said carrier in selected operative position.

6. The device as set forth in claim 5 wherein said carrier comprises a planar plate unitarily mounted between a pair of spaced bearing members for free alternate selective movement toward one or the other of said shafts upon actuation of said means to permit selective operative engagement of said idler gears with said gear on said shaft for actuation of an indicator associated therewith.

7. The device as set forth in claim 5 wherein said lever means comprises an elongate arm pivotally mounted in said housing and resiliently biased into selective coacting engagement with said carrier whereby a force is exerted on said carrier maintaining said carrier in selected operative position.

8. The device as set forth in claim 5 wherein said lever means comprises an elongate arm disposed in said housing opposite an end of the carrier remote from the selector means having a pivotal connection with the housing at one end and resilient means at the other end thereof biasing said arm toward said carrier, and an element mounted on said arm closer to said one end than said other end having surfaces for alternate selective engagement with an abutment on said carrier whereby a force of greater magnitude than the biasing force of the resilient means is exerted on said abutment and carrier to positively maintain the carrier in selected operative position.

9. The device as set forth in claim 5 wherein said lever means comprises an elongate arm disposed in said housing substantially transverse to said carrier and having a side thereof in spaced confronting relation with an end of said carrier remote from said means, said arm pivotally connected at one end within said housing, a spring connected to the other end thereof and said housing biasing said arm toward said carrier, and an element mounted on said arm closer to said one end than said other end having convergent cam surfaces, a unitarily mounted cam follower on said carrier adapted for alternate engagement with said cam surfaces whereby a force of greater magnitude than the biasing force of said spring is exerted on said cam follower and carrier to positively maintain the carrier in selected operative position.

10. The device as set forth in claim 5 including means for selectively positioning said carrier, comprising a shaft rotatably mounted in a cover of said housing and having a portion extending exteriorly thereof for detachably receiving a handle adapted for actuating the said shaft; and an inwardly extending portion operatively engaging a portion of said carrier whereby selective movement of said handle will be imparted to said positionable carrier for operatively engaging a selected indicator with said drive gear.

11. The device as set forth in claim 10 wherein said inwardly extending portion comprises a leg adjacent said carrier having a bifurcated portion thereon, an upstanding pin on said carrier operatively disposed in said bifurcated portion whereby selected movement of said handle will be imparted to said carrier.

12. The device as set forth in claim 11 wherein said cover and said handle are provided with means cooperatively receiving an element therebetween for absolutely maintaining said handle in any selected position and positively precluding inadvertent actuation of said handle.

13. A selective dual registration unit comprising: a pair of spaced apart selectively driven indicators mounted on and exteriorly of a housing; a pair of spaced apart optionally driven freely rotatable driven shafts mounted within the housing each having a gear thereon and each operatively connected to a respective indicator, a selectively positionable gear carrier pivotally mounted within said housing for alternate movement toward one or the other of said driven shafts, a drive shaft extending into said housing having a drive gear mounted thereon adjacent said carrier in operative engagement with spaced apart idler gears rotatably mounted on said carrier, the axes of the driven shafts, the gear carrier pivot and the drive shaft being parallel and lying in the same plane, a selector lever rotatably mounted on said housing about an axis parallel to the carrier pivot in operative engagement with a portion of said carrier for pivotally moving said carrier and idler gears toward one or the other of said driven shafts to permit selective operative engagement of one of said idler gears with a gear on the selected driven shaft whereby driving motion is imparted to said indicator from said drive gear, and means wholly disposed within said housing for holding said carrier in a selected indicator driving position consisting of an elongate pivotally mounted arm resiliently biased toward said carrier to engage a portion of said carrier and exert a force on said portion to maintain said carrier in the selected indicator driving position.

14. A device as set forth in claim 13 wherein said housing is provided with a pair of spaced upstanding members each having a face in confronting relation with a respective side of said carrier and selectively engageable with said respective side when the carrier reaches a predetermined point of pivotal movement whereby undue meshing and consequent binding of an idler gear and a cooperating driven gear is avoided.

15. In a drive selector mechanism, three spaced shafts rotatable about fixed axes, two of said shafts being equally spaced from the third shaft, gears on said shafts, a gear carrier pivoted for rocking about the axis of said third shaft, idler gears on said carrier constantly meshed with the gear on said third shaft, means for rocking said carrier between one limit position where one of said idler gears meshes with the gear on one of said two shafts and a second limit position where the other idler gear meshes with the gear on the other of said two shafts, a cam follower on said carrier spaced from the carrier pivot a distance that is greater than the distance between said carrier pivot and the axes of said two shafts, a lever pivoted for movement in a plane parallel to the carrier movement, means resiliently biasing said lever toward said carrier, and a cam on said lever for engagement with said follower to maintain said carrier in either selected limit position, said cam and a line joining the axes of said idler gears being located on opposite sides of said carrier pivot.

16. In the drive selector mechanism defined in claim 15, said cam follower comprising a roller and said cam having oppositely inclined faces adapted to engage the roller in the respective limit positions of the carrier.

17. In the drive selector defined in claim 15, spaced fixed stops limiting carrier movement in both directions to prevent binding of said gears.

18. In a flow meter indicating mechanism including a meter having an output shaft and a housing extension with a mounting pad thereon surrounding the output shaft, and a plurality of indicating devices having input shafts and adapter housings surrounding said input shafts; an indicating device selector mechanism comprising a housing, a centrally located drive shaft and a plurality of driven shafts mounted thereon the axes of which are equidistantly off-set from the drive shaft axis, mounting means for interconnecting the selector housing to said mounting pad and engaging the drive shaft with said output shaft, means mounting said adapter housings on said selector housings to interconnect the driven shafts and the input shafts, the axes of all shafts being parallel, movable means in the selector housing to optionally engage said drive shaft with a selected driven shaft, and fixed stops in said housing to limit movement of said movable means.

19. In a drive selector housing, a pair of spaced apart driven shafts, each adapted to be operatively connected to a respective indicator, a drive shaft gear assembly mounted in the housing with the axis of the drive shaft located on a straight line joining the axes of said driven shafts, a gear carrier pivotally mounted in said housing about the axis of said drive shaft so as to be selectively shiftable toward one or the other of said driven shafts, a pair of spaced idler gears mounted on said carrier constantly meshed with said drive shaft gear assembly and adapted to engage respective gears on said driven shafts upon selective shifting of said carrier, a line joining the axes of said idler gears being spaced from the axis of said drive shaft, means operatively connected to said carrier adapted to shift said carrier to operatively engage the drive shaft gear with one of said driven shaft gears through a respective idler gear, locking means forcibly engaging said carrier at a point located at a greater distance from said drive shaft than the distnce between said drive shaft and the line joining said idler elements, and stops located on the housing to limit movement of the carrier for preventing binding of the idler gears with the gears on the driven shaft.

20. In a drive selector housing, a pair of spaced apart driven shafts, each adapted to be operatively connected to a respective indicator, a drive shaft gear assembly mounted in the housing with the axis of the drive shaft located on a straight line joining the axes of said driven shafts, a gear carrier pivotally mounted in said housing about the axis of said drive shaft so as to be selectively shiftable toward one or the other of said driven shafts, a pair of spaced idler gears mounted on said carrier constantly meshed with said drive shaft gear assembly and adapted to engage respective gears on said driven shafts upon selective shifting of said carrier, a line joining the axes of said idler gears being spaced from the axis of said drive shaft, means operatively connected to said carrier adapted to shift said carrier to operatively engage the drive shaft gear with one of said driven shaft gears through a respective idler gear, and locking means forcibly engaging said carrier at a point located at a greater distance from said drive shaft than the distance between said drive shaft and the line joining said idler elements comprising an elongated lever pivoted at one end and a spring connected to the other end for biasing the lever into engagement with the carrier.

21. In a drive selector housing, a pair of spaced apart driven shafts, each adapted to be operatively connected to a respective indicator, a drive shaft gear assembly mounted in the housing with the axis of the drive shaft located on a straight line joining the axes of said driven shafts, a gear carrier pivotally mounted in said housing about the axis of said drive shaft so as to be selectively shiftable toward one or the other of said driven shafts, a pair of spaced idler gears mounted on said carrier constantly meshed with said drive shaft gear assembly and adapted to engage respective gears on said driven shafts upon selective shifting of said carrier, a line joining the axes of said idler gears being spaced from the axis of said drive shaft, means operatively connected to said carrier adapted to shift said carrier to operatively engage the drive shaft gear with one of said driven shaft gears through a respective idler gear comprising an L-shaped member having one leg journalled in said housing, the other leg of the member operatively connected to the carrier for shifting said carrier upon rotation of said L-shaped member and the end of said one leg protruding to the exterior of the housing, and locking means forcibly engaging said carrier at a point located at a greater distance from said drive shaft than the distance between said drive shaft and the line joining said idler elements.

References Cited in the file of this patent

UNITED STATES PATENTS

| | | |
|---|---|---|
| 1,587,162 | Lindblad | June 1, 1926 |
| 1,732,689 | Marden | Oct. 29, 1929 |
| 2,024,492 | Wallace | Dec. 17, 1935 |
| 2,084,396 | Hennessy | June 22, 1937 |
| 2,100,052 | Hejduk et al. | Nov. 23, 1937 |
| 2,268,174 | Spanko | Dec. 30, 1941 |
| 2,289,869 | Berck | July 14, 1942 |
| 2,309,332 | Tancred | Jan. 26, 1943 |

FOREIGN PATENTS

| | | |
|---|---|---|
| 461,931 | Italy | Feb. 20, 1951 |